United States Patent
Matsumiya et al.

(10) Patent No.: US 8,650,767 B2
(45) Date of Patent: Feb. 18, 2014

(54) COORDINATES MEASURING HEAD UNIT AND COORDINATES MEASURING MACHINE

(75) Inventors: Sadayuki Matsumiya, Kawasaki (JP); Susumu Yoshioka, Kawasaki (JP); Shuichi Kamiyama, Kawasaki (JP); Tomoyuki Miyazaki, Kawasaki (JP); Masanori Arai, Kawasaki (JP)

(73) Assignee: Mitutoyo Corporation, Kawasaki-Shi (JP)

(*) Notice: Subject to any disclaimer, the term of this patent is extended or adjusted under 35 U.S.C. 154(b) by 205 days.

(21) Appl. No.: 13/237,025

(22) Filed: Sep. 20, 2011

(65) Prior Publication Data

US 2012/0073154 A1 Mar. 29, 2012

(30) Foreign Application Priority Data

Sep. 27, 2010 (JP) ................ 2010-215956

(51) Int. Cl.
*G01B 5/008* (2006.01)
(52) U.S. Cl.
USPC .......................................... 33/503
(58) Field of Classification Search
USPC ..................................... 33/503, 556
See application file for complete search history.

(56) References Cited

U.S. PATENT DOCUMENTS

| | | | | |
|---|---|---|---|---|
| 6,594,532 | B2 * | 7/2003 | Mills .............................. | 33/556 |
| 7,076,883 | B2 * | 7/2006 | Yamamoto et al. ............ | 33/556 |
| 7,395,607 | B1 * | 7/2008 | Broderick et al. ............. | 33/503 |
| 2001/0029778 | A1 | 10/2001 | Takemura | |
| 2002/0000047 | A1 | 1/2002 | Yoda et al. | |
| 2007/0266781 | A1 | 11/2007 | Nemoto et al. | |
| 2008/0148588 | A1 | 6/2008 | Yoshizumi et al. | |
| 2009/0198472 | A1 | 8/2009 | Nemoto et al. | |
| 2010/0269362 | A1 * | 10/2010 | Bos ................................ | 33/503 |
| 2012/0317826 | A1 * | 12/2012 | Jonas ............................. | 33/503 |
| 2013/0111774 | A1 * | 5/2013 | McMurtry et al. ............. | 33/503 |

FOREIGN PATENT DOCUMENTS

| | | |
|---|---|---|
| CN | 1073521 | 6/1993 |
| JP | 06-034356 | 2/1994 |
| JP | 11-325869 | 11/1999 |

* cited by examiner

*Primary Examiner* — G. Bradley Bennett
(74) *Attorney, Agent, or Firm* — Rankin, Hill & Clark LLP (57) ABSTRACT

A coordinates measuring head unit is provided, which is compact, inexpensive, and capable of performing high-precision measurements at high speeds, and facilitates, for example, measurements conducted on machine tools or in-situ measurements on transport lines. The head unit includes: drive means (an X-axis drive section, a Y-axis drive section, and a Z-axis drive section), an integrated housing for accommodating the drive means, and fixture means (fixture surface). The drive means allows a probe to be moved by computer numerical control along a plurality of drive axis, which are orthogonal to each other, and abut against a measuring target to measure the dimensions of the measuring target. The fixture means is provided on one of side surfaces of the housing to attach one of the drive means to a support (a support on a stand secured to a base).

18 Claims, 10 Drawing Sheets

Large error

Fig. 3B

Small error

COORDINATES MEASURING HEAD UNIT AND COORDINATES MEASURING MACHINE

CROSS-REFERENCE TO RELATED APPLICATION

The disclosure of Japanese Patent Application No. 2010-215956 filed on Sep. 27, 2010 including specifications, drawings and claims is incorporated herein by reference in its entirety.

BACKGROUND OF THE INVENTION

1. Field of the Invention

The present invention relates to a coordinates measuring head unit and a coordinates measuring machine. More particularly, the invention relates to a coordinates measuring head unit which is compact, inexpensive, and capable of conducting measurements at high speeds with high precision, and facilitates in-situ measurements such as measurements carried out on machine tools or transport lines. The invention also relates to a coordinates measuring machine which incorporates the coordinates measuring head unit.

2. Description of the Related Art

Three-dimensional coordinates measuring machines (hereinafter also referred to as the CMM) are known as a measuring apparatus for measuring three-dimensional coordinates with high precision.

However, the conventional CMM, which has a typical measurement stroke as long as about 500 mm, includes a large base (surface plate) on which a target to be measured (for example, work) is placed, and a large gate-shaped or C-shaped frame for moving a measuring probe relative to the base. For example, the measuring probe may be a contact-type touch probe for generating a touch signal when being brought into contact with the target to be measured (hereafter the measuring target) or a noncontact-type optical probe for capturing the image of the measuring target. The CMM further includes a head which can move the gate-shaped or C-shaped frame relative to the base along one axis (for example, the front-to-rear direction) and which can accomplish a relative movement on the gate-shaped or C-shaped frame along another axis (for example, in the right and left direction) orthogonal to the one axis. The probe is configured to move relative to the head in the vertical direction orthogonal to the two axes. Accordingly, the conventional CMM had to be big enough to cover not the portion to be measured but the entirety of the measuring object, while maintaining the required precision over the whole range of the measurement stroke. For this reason, the conventional CMM was inevitably large in size and footprint, expensive, and thus not suitable for measurements conducted on machines or in-situ measurements.

To solve such problems, the present applicant suggested a simple CMM, which could be incorporated into fabrication lines, in Japanese Patent Application Laid-Open No. Hei 6-34356 (hereinafter referred to as Patent Document 1), and another CMM, which could be incorporated into machining centers, in Japanese Patent Application Laid-Open No. Hei 11-325869 (hereinafter referred to as Patent Document 2).

SUMMARY OF THE INVENTION

However, the techniques disclosed in Patent Documents 1 and 2 were predicated on the use of a large CMM which had a long measurement stroke and was to be incorporated into machine tools or fabrication lines. There were therefore some problems with those techniques that the CMMs were expensive and needed a large footprint.

On the other hand, practical applications often show that small works of an outer size of about 40 mm to 100 mm are measured, and even in the case of large works, only the inner diameter thereof or the outer diameter of a shaft portion thereof are measured, so that long measurement strokes are not always required. In such a case, most conventional CMM's of even compact types, which had a measurement stroke of 500 mm or more, needed an extraordinarily increased footprint for the measuring target (portion).

Furthermore, to make measurements on a machine tool, the measurements may be conceivably performed with the cutting tool replaced with a measuring sensor (for example, a touch probe). This arrangement raised a problem that a movement error of the machine tool could not be detected because the measuring system (guides or scales) of the machine tool was used.

The present invention was developed to solve the conventional problems mentioned above. It is therefore an object of the invention to provide a coordinates measuring head unit which is compact, inexpensive, and capable of making measurements at high speeds with high precision, and which facilitates measurements conducted on machine tools or in-situ measurements on transport lines. It is another object of the invention to provide a coordinates measuring machine, a machine tool, and a transport line, which include the coordinates measuring head unit.

The present invention was developed by focusing on the fact that long strokes were not always required to measure a small measuring target or a portion of a large measuring target by the CMM with high precision. The invention provides a coordinates measuring head unit to solve the aforementioned problems. The coordinates measuring head unit includes: drive means for allowing a probe to be moved by computer numerical control (CNC) along a plurality of drive axis orthogonal to each other and brought into contact with a measuring target to measure the dimensions thereof; an integrated housing for accommodating the drive means; and fixture means provided on one of side surfaces of the housing to attach any one of the drive means to a support.

Here, the drive means may be formed of a combination of a linear guide, a ball screw, and a motor.

Furthermore, the probe may be movable in three-dimensional directions, and the drive means for moving the probe in a direction of its axis can be disposed on the side of the fixture means.

Alternatively, the probe may be movable in two-dimensional directions orthogonal to the axis direction of the probe.

Furthermore, the probe may be replaceable.

Furthermore, the present invention provides a coordinates measuring machine which includes the coordinates measuring head unit, a base on which a measuring target is placed, and a stand for supporting the coordinates measuring head unit on the base.

Here, Z-axis drive means for movements in the vertical direction may be attached to the stand, Y-axis drive means for movements in the direction of depth may be attached to the Z-axis drive means, X-axis drive means for movements in the lateral directions may be attached to the Y-axis drive means, and the probe can be attached to the X-axis drive means.

Furthermore, the base may be provided with a table which is to move the measuring target and includes means for measuring the amount of movement.

Furthermore, the position of the coordinates measuring head unit may be initially manually aligned with the position of the measuring target before starting measurements.

Furthermore, the probe may be replaced to allow the head unit to serve also as a micro-geometry measuring machine or an image measuring apparatus.

Furthermore, the present invention also provides a machine tool to which the coordinates measuring head unit is attached.

Here, it is possible for the probe of the coordinates measuring head unit to measure a machined object, while being machined by the machine tool, without demounting the object from the machine tool.

Furthermore, the coordinates measuring head unit may be moved while being linked to a measuring system of the machine tool.

Furthermore, the present invention provides a transport line to which the coordinates measuring head unit is attached.

Here, a plurality of coordinates measuring head units each with a probe having a different axis direction can be attached to the transport line.

The present invention also provides a robot arm to which the coordinates measuring head unit is attached.

The present invention also provides a transportable coordinates measuring machine in which the aforementioned coordinates measuring machine is mounted on a hand truck together with a drive battery.

According to the present invention, the coordinates measuring head unit is reduced in measurement stroke and separated from the base and the stand. This allows the head unit to be reduced in size and costs, to make measurements at high speeds with high precision, and to facilitate measurements conducted on machine tools and in-situ measurements on transport lines. In particular, since the measurement stroke is reduced, the head unit can simultaneously implement both high-speed and high-precision measurements, which could not be realized by large CMM's. Furthermore, the head unit can be easily incorporated into machine tools and transport lines (including fabrication lines and inspection lines).

In particular, high-precision three-dimensional measurements can be realized when the probe is made movable in three-dimensional directions, and the drive means for moving the probe in its axis direction is disposed on the side of the fixture means.

It is also possible to provide an extremely compact, inexpensive, and high-precision CMM which requires a very small footprint, when the CMM is provided with a base on which a measuring target is placed and a stand for supporting the coordinates measuring head unit on the base.

Furthermore, a cantilever type stand may be disposed in the direction of depth (the Y-axis direction) when viewed from the front. In this case, the X-axis drive axis can be disposed at the lowest layer most advantageously from the viewpoint of precision in order to minimize the load moving in the lateral direction (the X-axis direction) when viewed from the front.

Furthermore, the base may also include a table which is to move the measuring target and provided with measuring means for measuring the amount of movement. In this case, works greater than the stroke of the coordinates measuring head unit can also be measured, and thus this can be realized at reduced costs with improved accuracy when compared with the case where the coordinates measuring head unit itself is moved.

In particular, when the coordinates measuring head unit is attached to the head portion of a machine tool or the vicinity thereof, measurements on the machine can be carried out in a high-precision measuring system independently of the measuring system of the machine tool.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Now, referring to the drawings, an exemplary embodiment of the present invention will be described in more detail.

Figure 1:
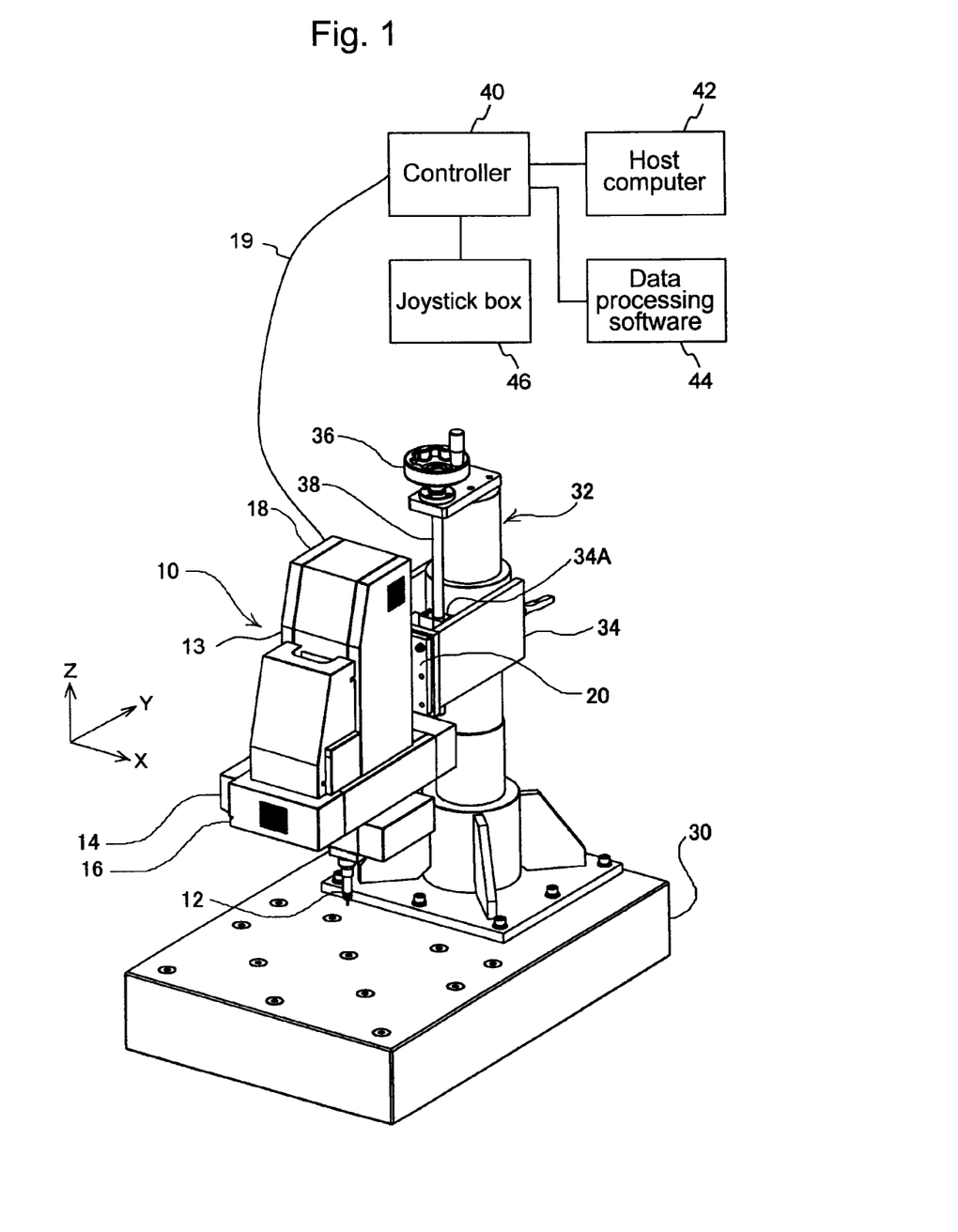
FIG. 1 is a perspective view illustrating a CMM which is provided with a coordinates measuring head unit according to an exemplary embodiment of the present invention.

FIG. 1 illustrates a CMM which is provided with a coordinates measuring head unit according to an exemplary embodiment of the present invention.

The coordinates measuring head unit 10 according to this exemplary embodiment includes an X-axis drive section 14 for freely moving a probe 12 in the X-axis direction (the right and left direction in the figure), a Y-axis drive section 16 for freely moving the X-axis drive section 14 in the Y-axis direction (the front-to-rear direction in the figure), and a Z-axis drive section 18 for freely moving the Y-axis drive section 16 in the Z-axis direction (the vertical direction in the figure). The head unit 10 also includes an integrated housing 13 for accommodating these sections, and fixture means (here, fixture surface) 20, provided on one of the side surfaces of the housing 13 (here, on the rear surface thereof), for attaching the Z-axis drive section 18 to a support (here, a support 34 of a stand 32 secured to a base 30). Here, the measurement strokes in the directions of respective axes can be, for example, 40 to 120 mm in the X-axis and Y-axis directions, and 40 mm in the Z-axis direction.

The coordinates measuring head unit 10 is connected through a cable 19 with a controller 40 for controlling the drive sections 14, 16, and 18. The controller 40 is connected with a host computer 42 for transmitting measurement commands and receiving measurement data for geometrical computations, data processing software 44, and a joystick box 46 for sending drive commands.

The data processing software 44 includes, for example, a probe compensation function for compensating the coordinate position and the diameter of the tip sphere of the probe 12, a temperature compensation function for compensating the measured coordinates and the dimensions of a measuring target (for example, work) depending on the temperature, and a spatial precision compensation function for compensating spatial precision statically or dynamically.

The coordinates measuring head unit 10 is attached to the support 34 of the stand 32 secured to the base 30 on which a measuring target (not shown) is placed. The support 34 has a screw portion 34A mated with a feed screw 38 which is rotated by a handle 36 disposed on the top of the stand 32. At the initial stage before starting measurements, the handle 36 can be rotated so that the vertical position of the support 34, that is, the coordinates measuring head unit 10 is manually adjusted to align with the position of a measuring target.

Figure 2A:
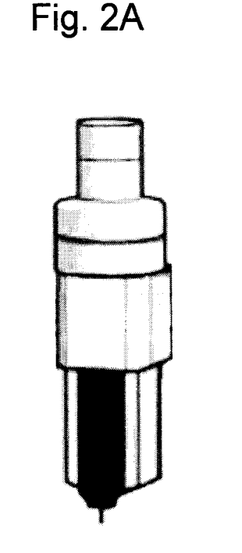
FIGS. 2A and 2B show different probes to be exchanged.
Figure 2B:
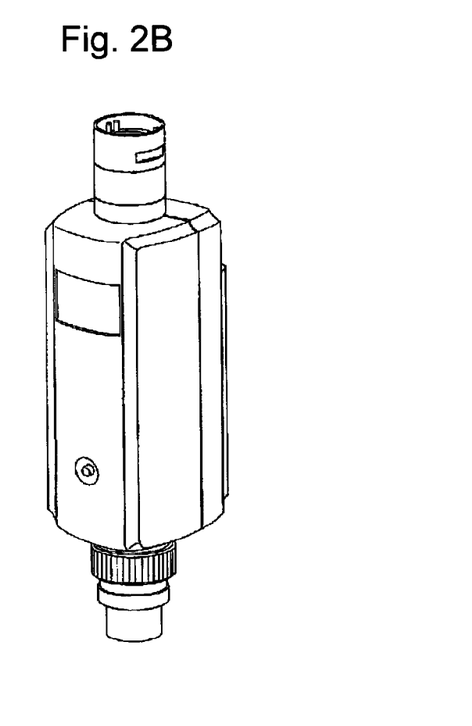

In this manner, the coordinates measuring head unit 10 can be attached to a dedicated stand like the stand 32, which is secured onto the base 30 and along which the support 34 moves vertically, thereby realizing a very compact CMM that requires only a limited footprint. The probe 12 is replaceable, so that the touch probe as shown FIG. 1 or a copying probe can be used for the CMM, a micro probe as shown in FIG. 2A can be used for a micro-geometry measuring device, and an image probe as shown in FIG. 2B can be used for an image measuring device.

Figure 3A:
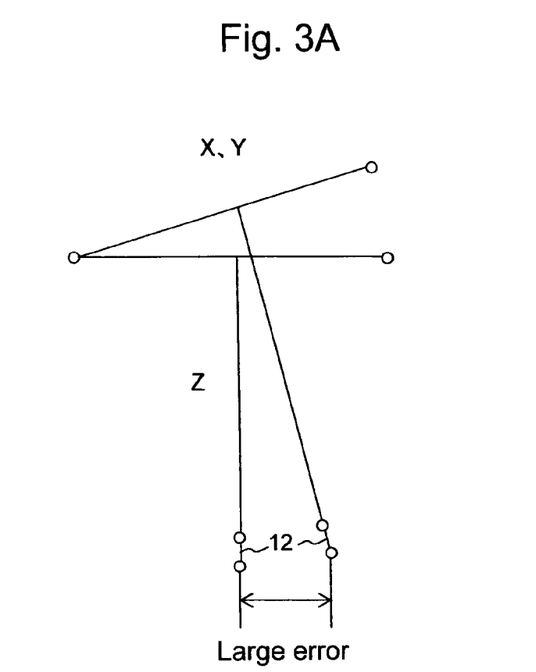
FIGS. 3A and 3B are views illustrating the relationship between the arrangement of a drive section and error.
Figure 3B:
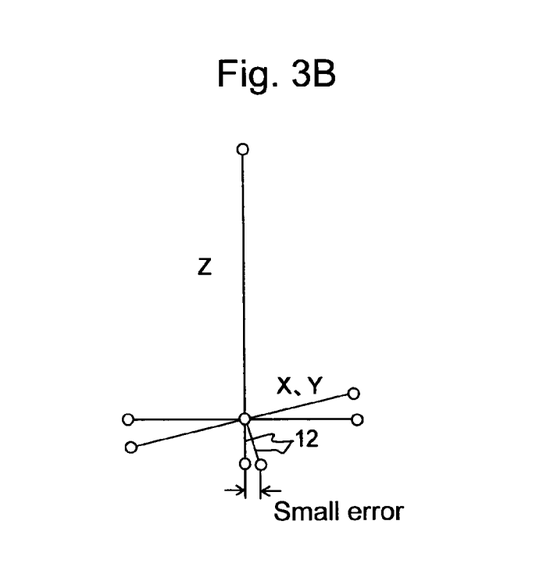

Here, the Z-axis drive section 18 for moving the probe 12 in the axis direction thereof (i.e., along the Z axis) is disposed on the fixture surface 20 side rather than on the X-axis drive section 14 side or the Y-axis drive section 16 side because of the following reasons. That is, as shown in FIG. 3A, the Z-axis drive section 18 may be disposed on the side of the probe 12 (at a lower position in the figure) rather than on the side of the X-axis drive section 14 or the Y-axis drive section 16. In this case, a tilt caused by the X-axis drive section 14 and the Y-axis drive section 16 being moved during measurements is magnified by the Z-axis drive section 18, resulting in an increase in error at the tip of the probe 12 (at the lower end in the figure). In contrast to this, as shown in FIG. 3B, this exemplary embodiment is configured such that the Z-axis drive section 18 is disposed on the side of the fixture surface 20 (at an upper position in the figure) rather than on the side of the X-axis drive section 14 or the Y-axis drive section 16. In this case, a tilt caused by the X-axis drive section 14 and the Y-axis drive section 16 being moved during measurements is not magnified by the Z-axis drive section 18, thus allowing no error to increase at the tip of the probe 12.

Figure 4:
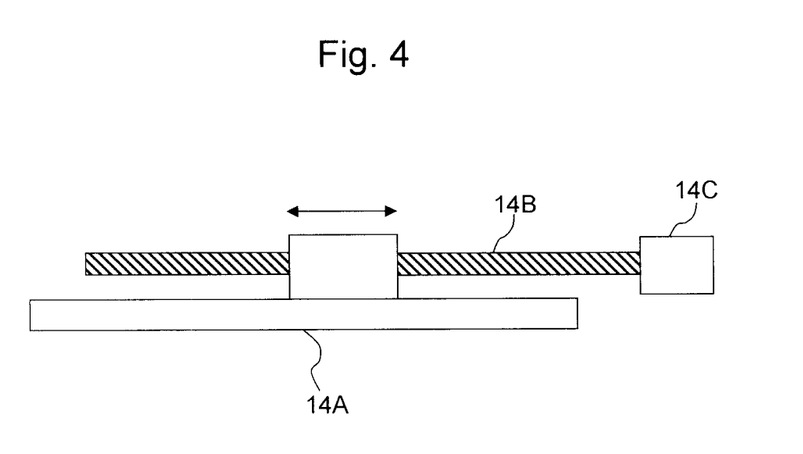
FIG. 4 shows internal structure of drive section.

Note that the drive mechanisms for the X-axis drive section 14, the Y-axis drive section 16, and the Z-axis drive section 18 may be preferably implemented, for example, by a combination of a linear guide 14A, a ball screw 14B, and a motor 14C as shown in FIG. 4 to prevent heat generation. This is because use of a small case for reducing the size of the drive sections would possibly cause heat to be confined therein, thereby causing problematic measurement errors to occur due to the heat generation of the drive system. Note that if heat generation would cause no problem, or countermeasures against heat generation, for example, by air or water cooling can be taken, then other drive systems, for example, linear motors can also be used.

Figure 5:
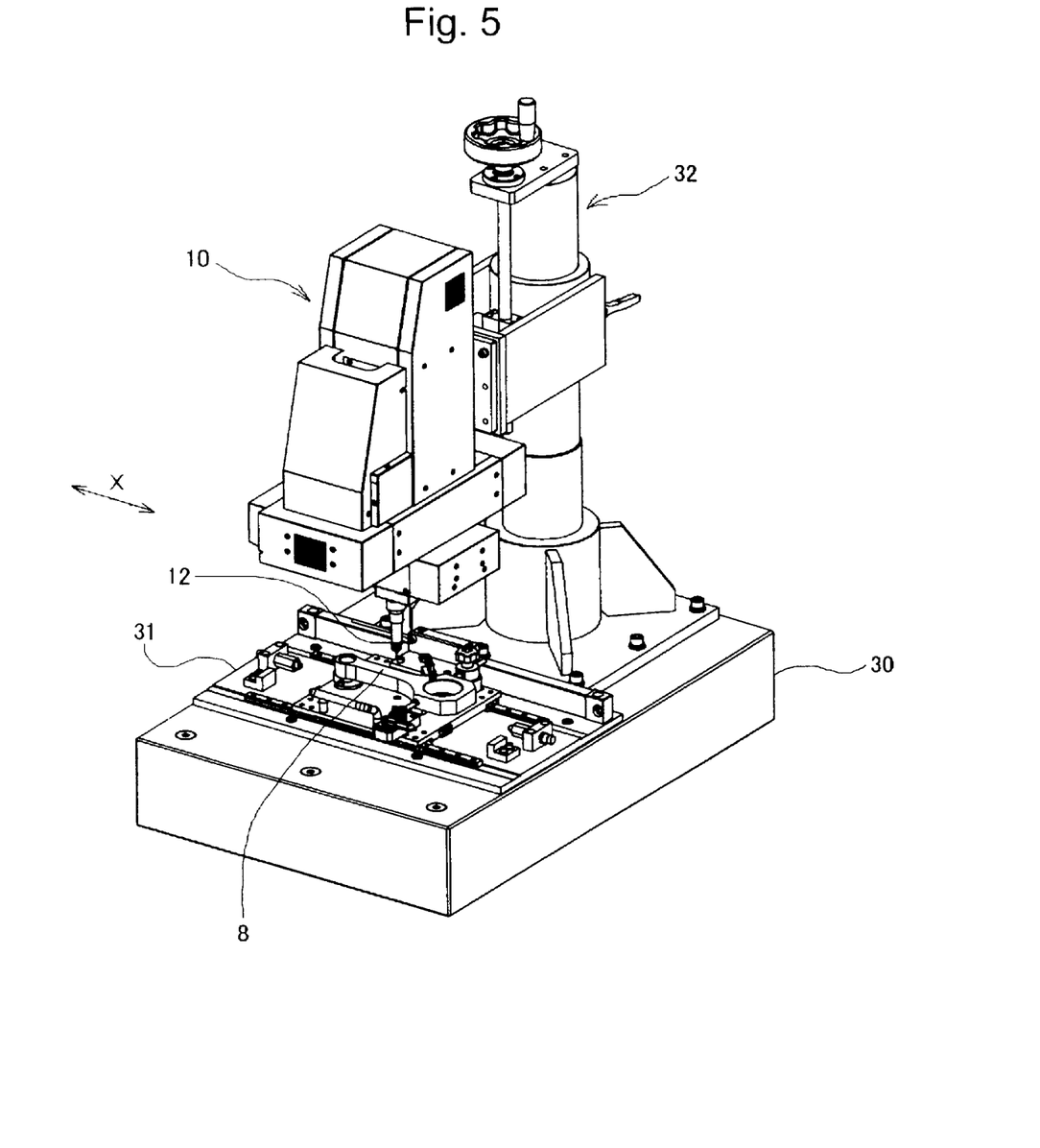
FIG. 5 is a perspective view illustrating the CMM of FIG. 1 which is provided with a table.

The example of FIG. 1 is configured such that the measuring target is directly placed on the base 30 to carry out three-dimensional measurements. However, in a modified example shown in FIG. 5, a table 31 for moving a measuring target (work) may be placed on the base 30 so as to extend the measurement stroke for the measuring target (a connection rod 8 in the figure) in the direction(s) of one or two axes (only one axis in the figure, i.e., in the X-axis direction). Here, the table 31 is movable along the one or two axes (only one axis in the figure, i.e., in the X-axis direction), and the amount of movement thereof can be output, for example, by a linear encoder. As such, the measuring target 8 is made movable, thereby allowing for extending the three-dimensional measurement stroke with high accuracy at reduced costs as compared to the case where the coordinates measuring head unit 10 is moved. Although FIG. 5 shows an example of one axis, a two-axis XY table may also be employed.

Note that the work can be fed by a carrier to which a computer provides sequential control, or alternatively the work may also be manually moved. Furthermore, a one- or two-axis carrier or a robot arm may also be employed to feed the work.

Figure 6:
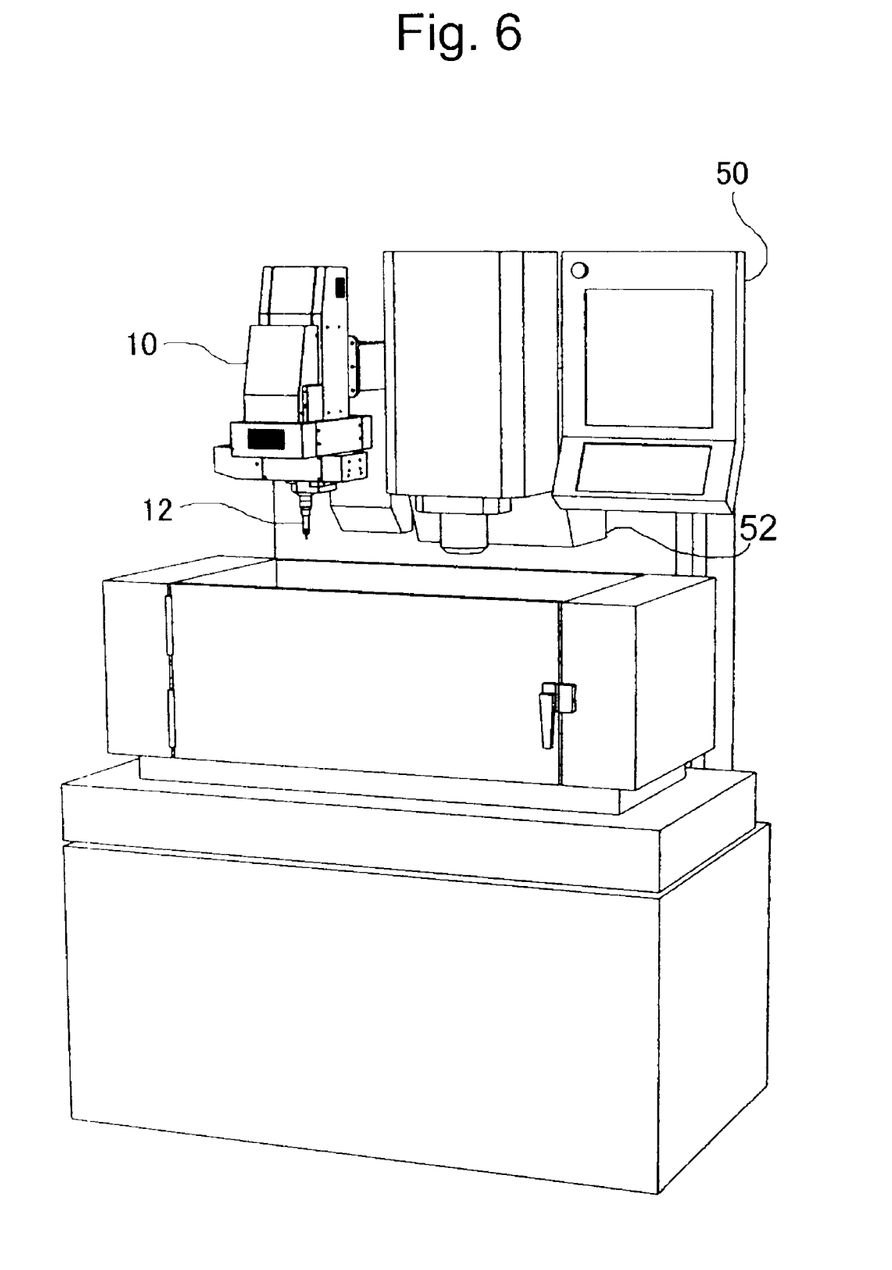
FIG. 6 is a perspective view illustrating an electric discharge machine which is provided with a coordinates measuring head unit according to an exemplary embodiment of the present invention.

FIG. 6 shows an example of a machine tool (an electric discharge machine 50 in the figure) to which the coordinates measuring head unit 10 has been attached. The compact coordinates measuring head unit 10 can be attached to the machining head portion of the machine tool or the vicinity thereof, thereby allowing measurements to be performed comparatively easily on the machine. Unlike a typical sensor (such as the touch probe), the head unit 10 has independent measuring and drive systems, and is thus not affected by the precision in movement of the machine tool.

Note that although the stroke of the coordinates measuring head unit 10 is shorter than that of a typical machine tool, multiple works being machined at a time may be each accommodated in the stroke of the coordinates measuring head unit 10. In such a case, use of only the coordinates measuring head unit 10 may be sufficient for measurements; however, to measure the entirety of the works, the head unit 10 can also be linked to the measuring system 52 of the machine tool.

The coordinates measuring head unit 10 may be incorporated not only into the electric discharge machine but also into a machining center as disclosed in Patent Document 2 or other general machine tools.

Furthermore, although the coordinates measuring head unit 10 is preferably attached to the machining head portion of the machine tool or the vicinity thereof, the head unit 10 can also be attached to other than the machining head portion or the vicinity thereof so far as the head unit 10 is accessible to the table of the machine tool. Moreover, the head unit 10 can also be separated from the machine tool to make measurements. That is, the compactness of the coordinates measuring head unit 10 can be made available in a variety of flexible arrangements, for example, incorporated into the machine tool, adjoined to the machine tool, disposed as a standalone unit apart from the machine tool, or disposed in plurality on the outlet of the line through which the machine tool provides machined works.

Note that the axis direction of the probe 12 is oriented in the vertical direction (i.e., the Z-axis direction) in the exemplary embodiments of vertical type above; however, the axis direction of the probe 12 can also be arranged in the horizontal direction in lateral type.

Figure 7:
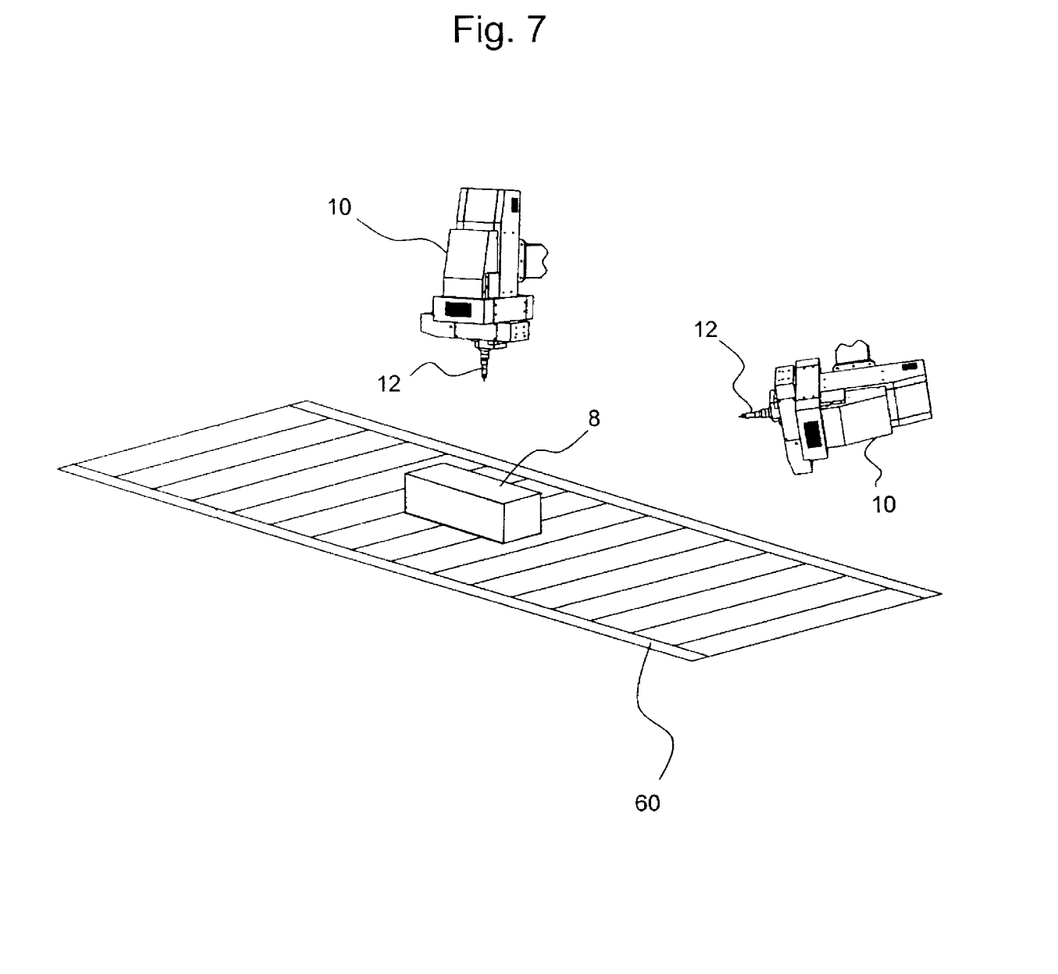
FIG. 7 is a perspective view illustrating the main portion of a transport line which is provided with coordinates measuring head units according to an exemplary embodiment of the present invention.

FIG. 7 shows an example in which a plurality of coordinates measuring head units 10 (two in the figure) are disposed in the vicinity of a conveyor 60 of a transport line, with the axis direction of the probe 12 of one unit oriented vertically (vertical type) and that of the other unit oriented horizontally (lateral type).

A plurality of coordinates measuring head units 10 can be arranged in this manner, thereby allowing quick online measurements to be carried out on a transport line.

Figure 8:
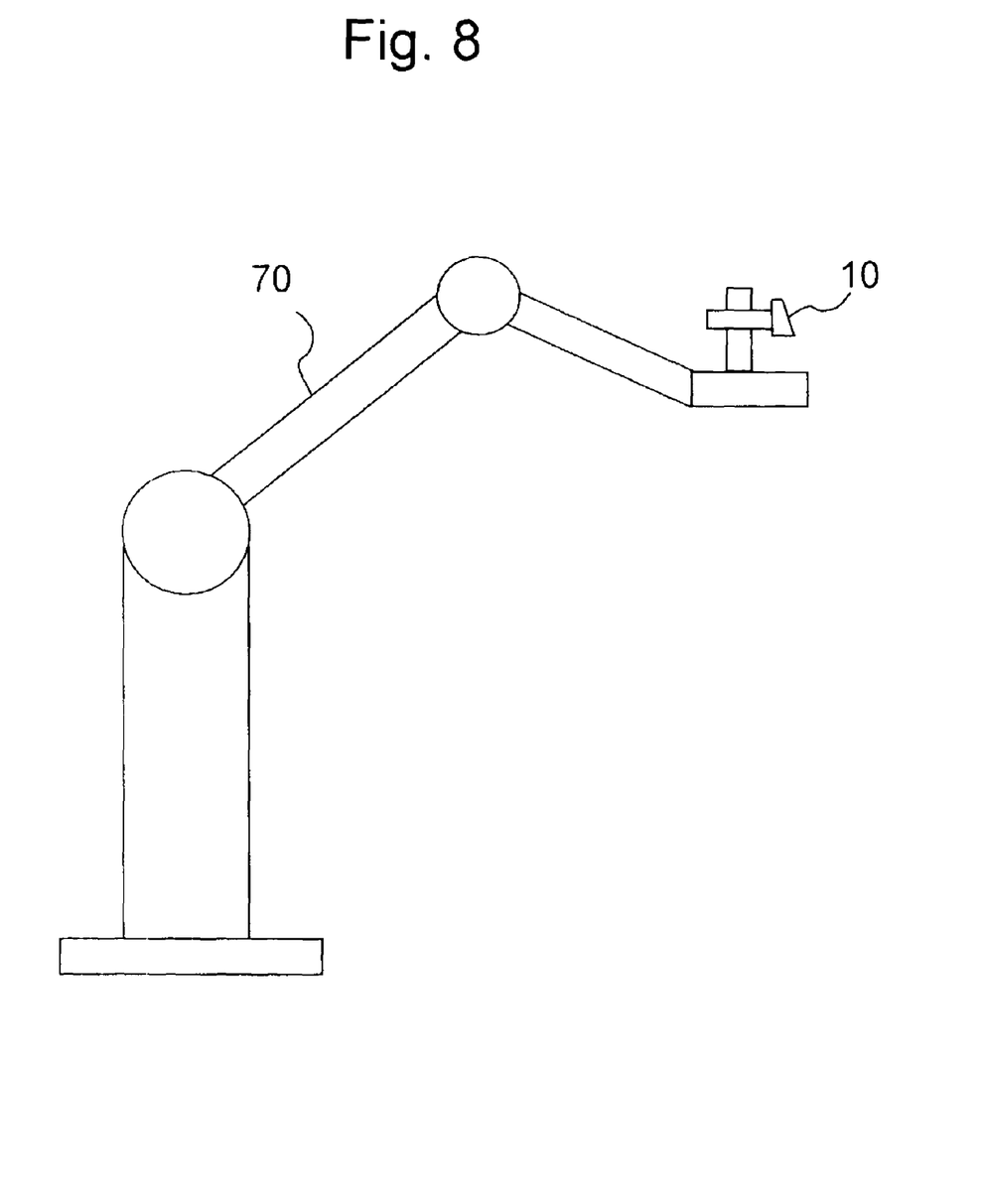
FIG. 8 is a perspective view illustrating a robot arm which is provided with coordinates measuring head unit according to an exemplary embodiment of the present invention.

Note that the coordinates measuring head unit 10 can be arranged on the fabrication line or the inspection line, regardless of the type of target, and for example, the head unit 10 can be attached to an arm of a robot as shown in FIG. 8.

Figure 9:
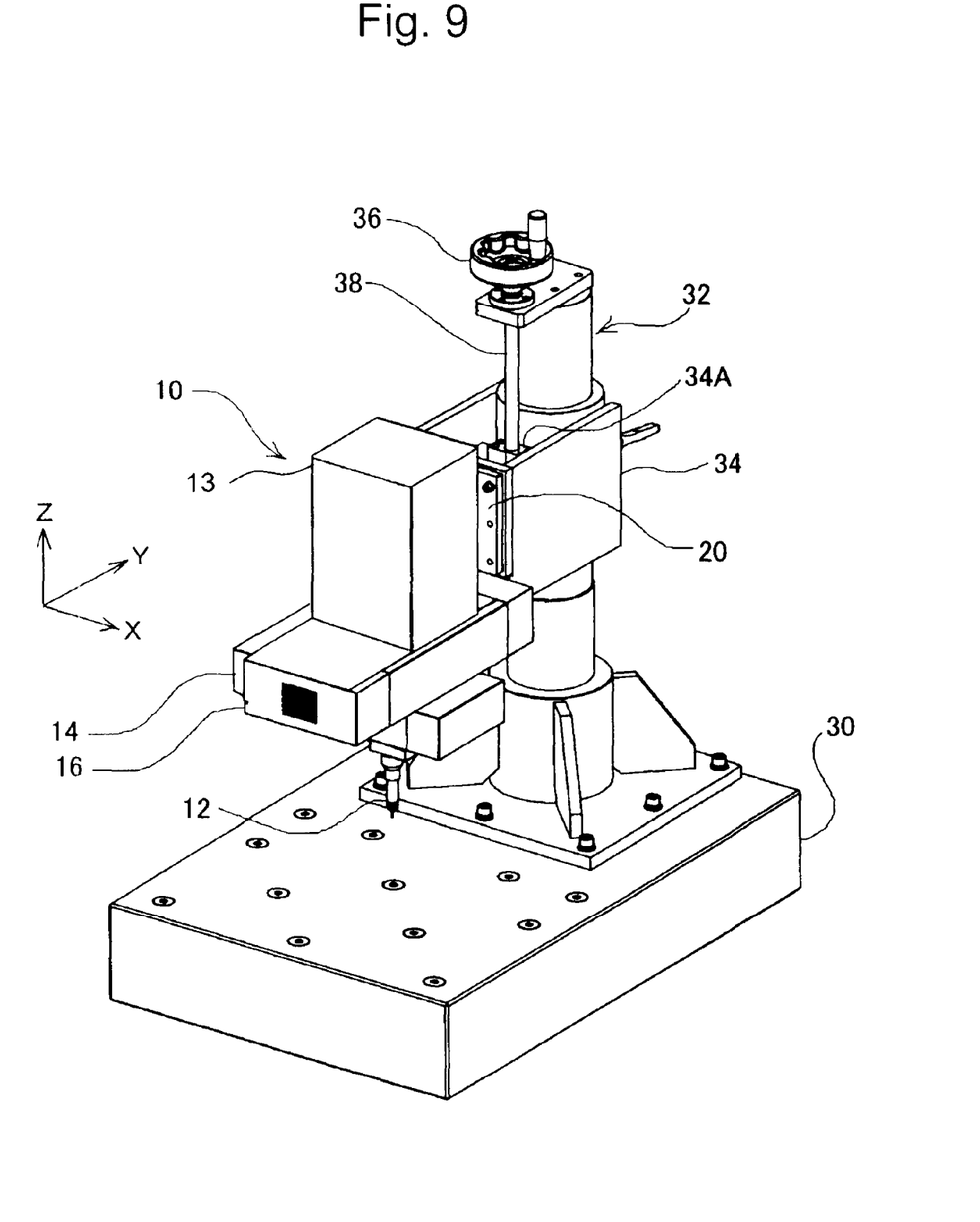
FIG. 9 is a perspective view illustrating a two-dimensional coordinated measuring system which is provided with coordinates measuring head unit according to an exemplary embodiment of the present invention.

Furthermore, for example, the Z-axis drive section 18 can also be eliminated as shown in FIG. 9 to make two-dimensional coordinates measurements.

Figure 10:
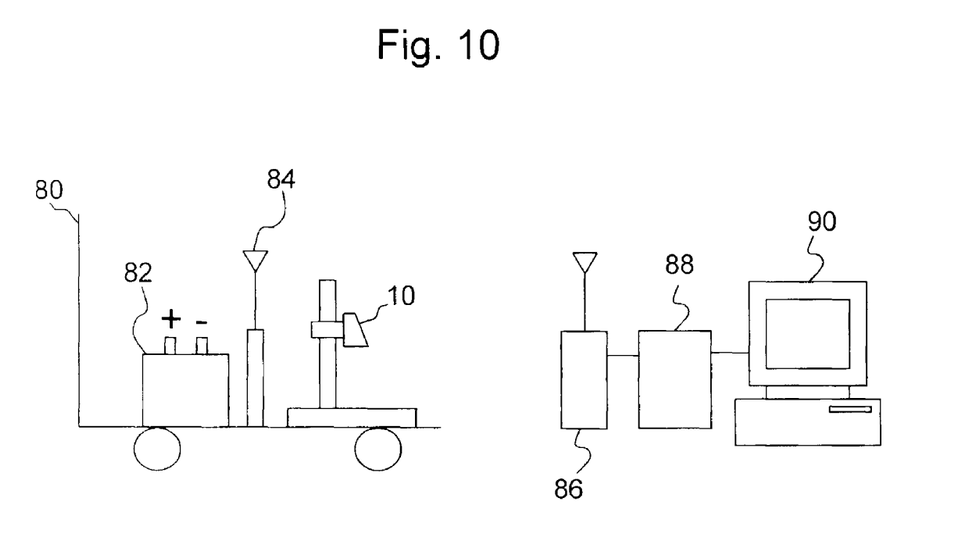
FIG. 10 is a perspective view illustrating a transportable CMM which is provided with coordinates measuring head unit according to an exemplary embodiment of the present invention.

Furthermore, a transportable CMM as shown in FIG. 10 can also be realized by mounting the very compact CMM illustrated in FIG. 1 onto a hand truck 80 together with a drive battery 82 and a wireless transmitter 84, with measurement signals transmitted wirelessly to a receiver 86, a computing device 88 and a display device 90.

The present invention can be preferably used to measure the outer shape of small parts having complicated shapes, for example, the turbo-charger of an internal combustion engine or the shape of a fin of a jet engine by copying, the inner diameter of holes, and the outer diameter of shafts.

It should be apparent to those skilled in the art that the above-described exemplary embodiments are merely illustrative which represent the application of the principles of the present invention. Numerous and various other arrangements can be readily devised by those skilled in the art without departing from the spirit and the scope of the invention.

What is claimed is:

1. A coordinates measuring head unit comprising:
x-axis, y-axis, and z-axis drive means for moving a probe by computer numerical control along an x-axis, y-axis, and z-axis, respectively and bringing the probe into contact with a measuring target to measure dimensions thereof, the x-axis, y-axis, and z-axis being orthogonal to each other, an axis of the probe being in parallel with the z-axis, the probe being mounted on the x-axis drive means, the x-axis drive means being mounted on the y-axis drive means, and the y-axis drive means being mounted on the z-axis drive means;
an integrated housing for accommodating the drive means; and
fixture means provided on the z-axis drive means to attach the z-axis drive means to a stand.

2. The coordinates measuring head unit according to claim 1, wherein the drive means is formed of a combination of a linear guide, a ball screw, and a motor.

3. The coordinates measuring head unit according to claim 1, wherein the probe is replaceable.

4. A coordinates measuring machine comprising:
the coordinates measuring head unit according to claim 1;
a base on which a measuring target is placed; and
a stand for supporting the coordinates measuring head unit on the base.

5. The coordinates measuring machine according to claim 4, wherein Z-axis drive means for movements in a vertical direction is attached to the stand.

6. The coordinates measuring machine according to claim 4, wherein the base is provided with a table which is to move the measuring target and includes means for measuring an amount of movement.

7. The coordinates measuring machine according to claim 4, wherein a position of the coordinates measuring head unit can be initially manually aligned with a position of the measuring target before starting measurements.

8. The coordinates measuring machine according to claim 4, wherein the probe is replaced to allow the measuring machine to serve also as a micro-geometry measuring machine or an image measuring apparatus.

9. A machine tool to which the coordinates measuring head unit according to claim 1 is attached.

10. The machine tool according to claim 9, wherein the probe of the coordinates measuring head unit can measure a machined object, while being machined by the machine tool, without demounting the object from the machine tool.

11. The machine tool according to claim 9, wherein the coordinates measuring head unit is moved while being linked to a measuring system of the machine tool.

12. A transport line to which the coordinates measuring head unit according to claim 1 is attached.

13. The transport line according to claim 12, wherein a plurality of the coordinates measuring head units each with a probe having a different axis direction are attached to the transport line.

14. A robot arm to which the coordinates measuring head unit according to claim 1 is attached.

15. A transportable coordinates measuring machine in which the coordinates measuring machine according to claim 4 is mounted on a hand truck together with a drive battery.

16. The coordinates measuring head unit according to claim 1, wherein the coordinates measuring head unit is separated from a stand and a base, and does not include a stand and a base.

17. The coordinates measuring head unit according to claim 1, wherein a fixture surface of the fixture means is in parallel with the z-axis.

18. The coordinates measuring head unit according to claim 1, wherein when the z-axis drive means moves the probe, the x-axis drive means and the y-axis drive means are moved by the z-axis drive means.

* * * * *